D. C. LEONARD.
MOTOR DRIVE FOR LOOMS.
APPLICATION FILED APR. 28, 1921.
1,406,878.
Patented Feb. 14, 1922.
3 SHEETS—SHEET 1.
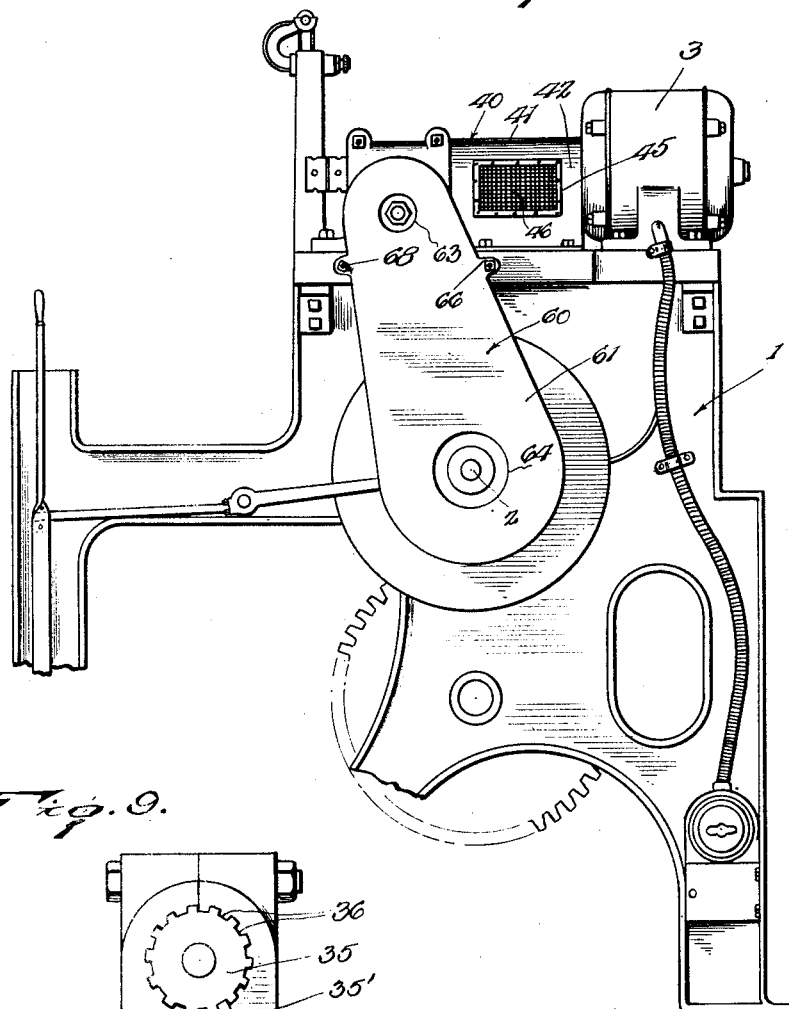
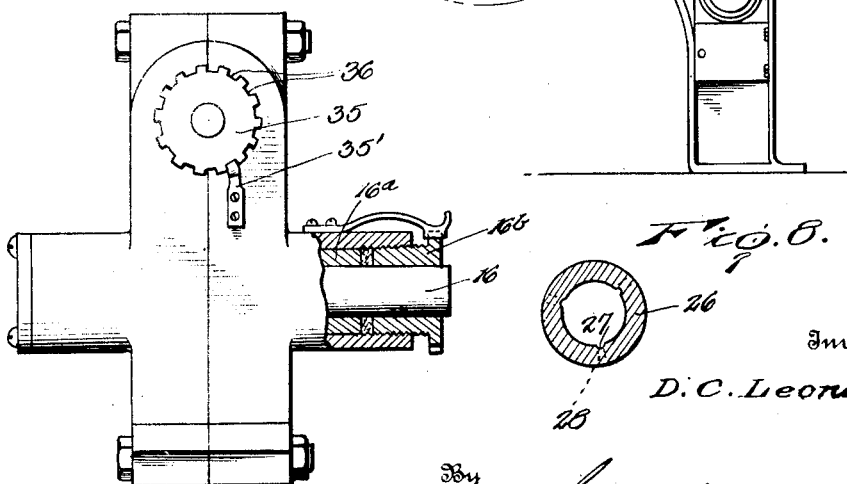
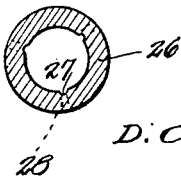
Inventor
D. C. Leonard.
By Laury & Laury, Attorneys

D. C. LEONARD.
MOTOR DRIVE FOR LOOMS.
APPLICATION FILED APR. 28, 1921.

1,406,878.

Patented Feb. 14, 1922.
3 SHEETS—SHEET 2.

Inventor
D. C. Leonard.

By
Lacey & Lacey, Attorneys

D. C. LEONARD.
MOTOR DRIVE FOR LOOMS.
APPLICATION FILED APR. 28, 1921.
1,406,878.
Patented Feb. 14, 1922.
3 SHEETS—SHEET 3.
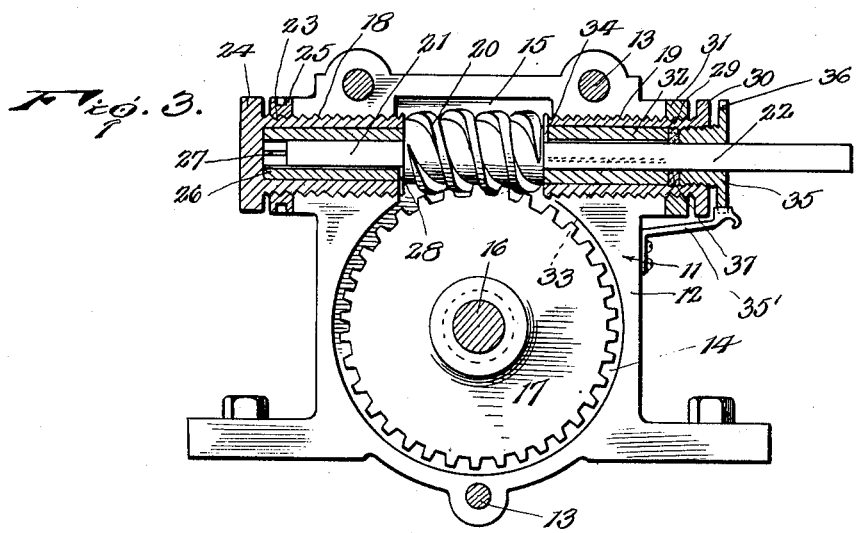
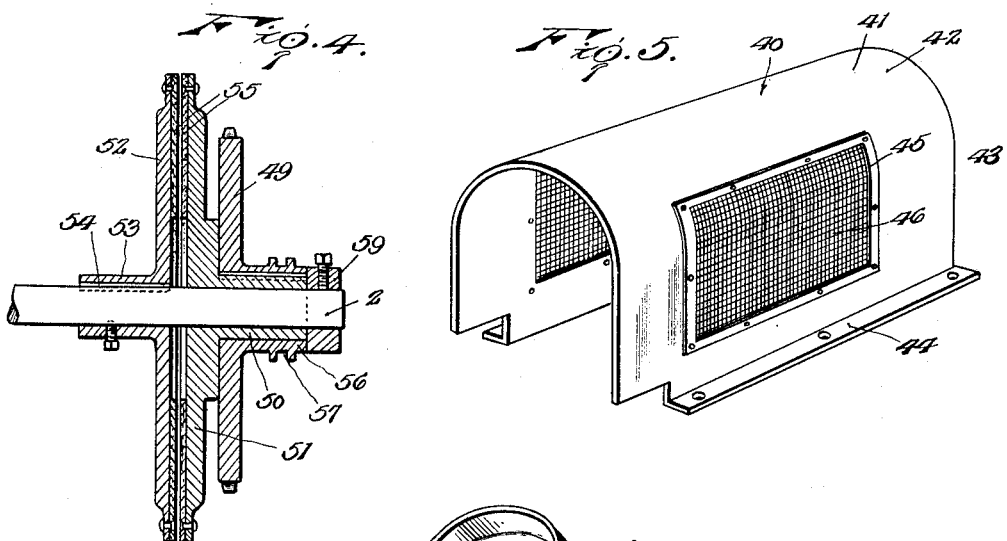
Inventor
D. C. Leonard
By
Lacey & Lacey, Attorneys

UNITED STATES PATENT OFFICE.

DON CARLOS LEONARD, OF GREENVILLE, SOUTH CAROLINA.

MOTOR DRIVE FOR LOOMS.

1,406,878. Specification of Letters Patent. Patented Feb. 14, 1922.

Application filed April 28, 1921. Serial No. 465,191.

*To all whom it may concern:*

Be it known that I, DON C. LEONARD, a citizen of the United States, residing at Greenville, in the county of Greenville, and State of South Carolina, have invented certain new and useful Improvements in Motor Drives for Looms, of which the following is a specification.

This invention relates to improvements in motor drives for looms and has as its general object to provide an electric motor operated drive embodying a compact arrangement of parts and adapted to be readily installed upon any of the well known types of looms and in its operation to drive the loom with a steady application of power and without the liability of break downs which so frequently occur in the use of the ordinary types of drives because of the enormous strains and irregular resistance to the transmission of the power to which such drives are subjected in the operation of the loom.

Another and more specific object of the invention is to provide an improved arrangement of transmission gearing for transmitting power from the electric motor employed, to the power shaft of the loom, this gearing being an improvement on that shown in my co-pending application filed February 14, 1920, Serial No. 358,589.

Another object of the invention is to provide a novel form of guard for the motor shaft and the power shaft of the transmission gearing as well as the coupling which connects these shafts, the guard being so constructed as to effectually prevent any objects coming in contact with these rotating parts and at the same time providing for ventilation so that the bearings will not run hot.

Another object of the invention is to provide a novel and improved means for mounting the drive mechanism, and in connection with this means, a novel chain guard for protecting the chain gearing which transmits power from the transmitting mechanism to the power shaft of the loom.

Another object of the invention is to provide a novel form of clutch for the loom power shaft.

Figure 2:
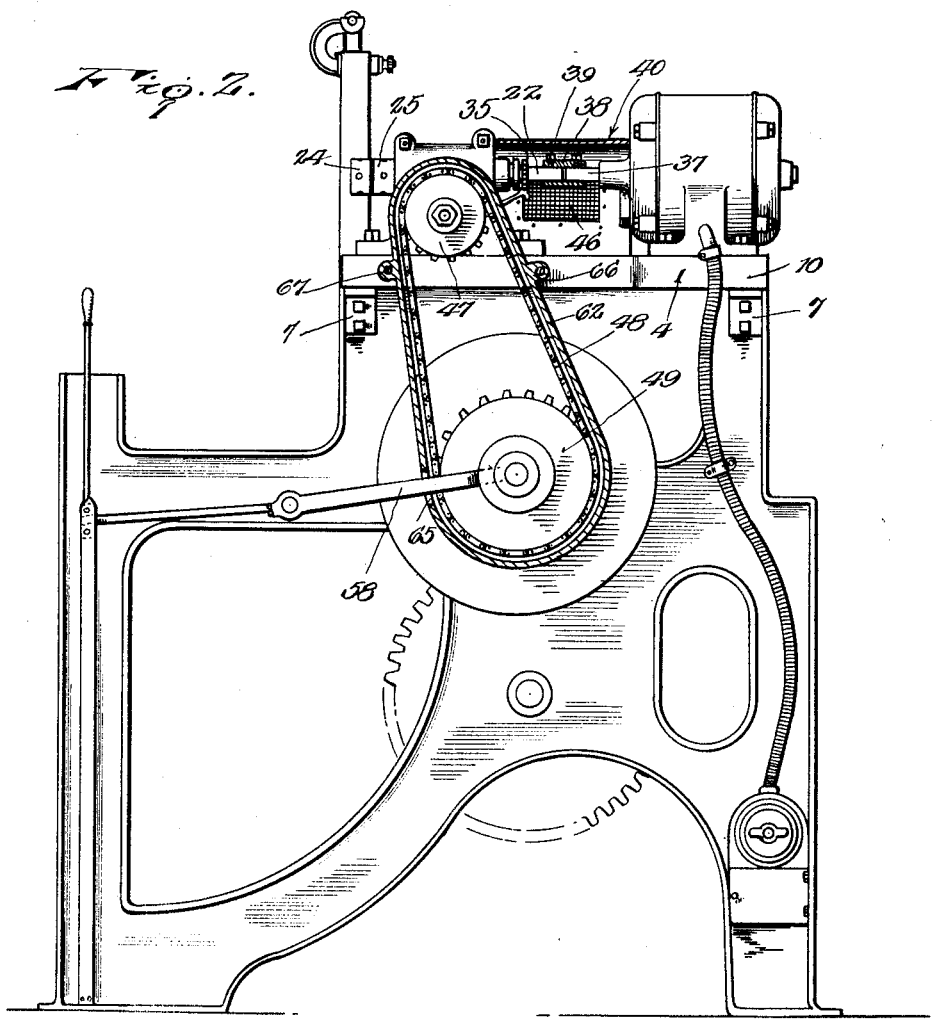
Figure 7:
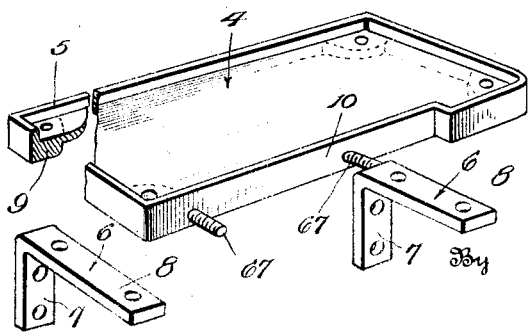

In the accompanying drawings:

Figure 1 is an end elevation of a loom of a well known type in connection with which the mechanism of the present invention is employed, Figure 2 is a similar view illustrating parts of the invention in section, Figure 3 is a detail vertical longitudinal sectional view through the transmission mechanism of the invention, Figure 4 is a detail transverse sectional view through the clutch embodying the invention, Figure 5 is a perspective view of the protective shield for the motor and transmission gearing shafts, Figure 6 is a perspective view of the chain guard embodying the invention, Figure 7 is a perspective view of the base and supports upon which the mechanism of the invention is mounted, Figure 8 is a detail transverse sectional view through a bearing bushing employed in connection with the transmission gearing, Figure 9 is a view in end elevation, parts being shown in section, of the drive embodying the invention.

In the drawings, the numeral 1 indicates in general one of the end frames of a loom of a well known type upon which end frame the various parts comprising the mechanism of the present invention are to be supported, and the numeral 2 indicates the power shaft of the loom to which power is to be transmitted from an electric motor which is indicated in general by the numeral 3 and which constitutes the source of power and may be of any desired type and capacity. In order to support the motor and the various other appurtenances embodying the invention, there is provided a base which is most clearly illustrated in Figure 7 of the drawings and which is indicated in general by the numeral 4. This base may and preferably does comprise a single integral casting having a supporting portion which is substantially flat upon its upper side except at its margin where it is provided with an upstanding bead or flange 5 to catch and retain any oil which may drip or be discharged from the mechanism supported by the base. The said base 4 may be of any desired marginal contour and of any required size and the same is supported upon brackets which are indicated by the numeral 6 and each of which comprises an attaching portion 7 bolted or otherwise secured to the end frame 1 of the loom and an outstanding supporting arm 8 which is bolted or otherwise secured to the under side of the base 4. In order to adapt the base for the attachment thereto of the brackets 6, the base is provided upon its under side at each of its four corners with bosses or thickened portions 9 the under surfaces of which are flush with the lower edge of a flange 10 which depends from the under side of the base and extends continuously about the margin thereof, the base being disposed with its bosses 9 resting upon the upper sides of the arms 8 of the respective brackets 6 and being secured in the manner stated to these arms.

The transmission gearing which transmits power from the motor 3 and which, together with the said motor, is secured upon the base 4, is of substantially the construction disclosed in my above-mentioned co-pending application except in certain particulars which will now be fully set forth. The transmission gearing is mounted within a casing indicated in general by the numeral 11 and comprises two counter-part sections adapted to be secured together by means of bolts 13. These casing sections are recessed to provide a lower gear chamber 14 and an upper gear chamber 15, and the said sections are provided axially of the chamber 14 with bearings in which is mounted a shaft 16 carrying a worm gear 17. The casing sections are also formed with half bores 18 and 19 axially alined with each other and with the upper gear chamber 15, and these bores are of corresponding diameter and are correspondingly internally threaded from end to end. The numeral 20 indicates a worm which is housed within the gear chamber 15 and meshes with the worm gear 17, and this worm is provided at one end with a shaft extension 21 and at its other end with a shaft extension 22, the latter being of greater length than the former. A sleeve 23 is adjustably threaded into the bore 18 and is of a length to project at its inner end into the gear casing 15 where it abuts against the adjacent end of the worm 20. This sleeve 23 is provided at its outer end with a head 24 suitably constructed in any manner desired for the application of means whereby the sleeve may be rotatably adjusted so as to feed it longitudinally within the bore 18 and thus coact with the end of the worm 20 to take up play. A jam nut 25 is threaded onto the sleeve 23 near its outer end and is designed to bear against the gear casing 11 at the outer end of the bore 18 so as to hold the sleeve 23 in positions of adjustment. A bushing 26 of any suitable bearing metal is driven into the sleeve 23 and at one end bears against the head 24 which closes the outer end of the sleeve and at its other end is flush with the inner end of the said sleeve, and this bushing rotatably receives the shaft extension 21 of the worm 20. The bushing is formed interiorly with longitudinally extending lubricant grooves 27 which communicate with notches 28 formed radially in the outer end of the bushing and the outer end of the sleeve 23. In this manner oil is permitted to pass from the interior of the gear casing through the notches 28 and into the grooves 27 to lubricate the shaft extension 21.

A sleeve 29 is adjustably threaded into the bore 19 and is provided at its outer end with a head 30 corresponding to the head 24 of the sleeve 23 and similarly adapted for the application of a tool whereby the said sleeve 29 may be rotatably adjusted and thus caused to have suitable bearing engagement at its inner end against the other end of the worm 20 so that the worm is confined between the adjacent or opposing ends of the sleeves 23 and 29 and is prevented from having any longitudinal play and thus no thrust can be imparted to the shaft of the electric motor, which shaft is connected with the shaft extension 22 in a manner which will presently be explained. A jam nut 31 is threaded onto the outer end portion of the sleeve 29 and is adapted to be tightened to bear against the casing 11 at the outer end of the bore 19 and serves to hold the sleeve 29 in positions of adjustment. A bushing 32 corresponding to the bushing 25 is driven into the sleeve 29 and is provided with longitudinally extending oil grooves or ducts 33 and in its inner end with notches 34 corresponding respectively to the grooves 27 and notches 38 of the bushing 26. The bore of the sleeve 29 extends entirely through the sleeve from end to end, and a packing gland 35 is threaded into the outer end of the bore and locked at adjustment by a spring pawl 35' coacting with teeth 36 upon the periphery of the said gland and bears at its inner end against a packing washer 37 interposed between it and the adjacent end of the bushing 32, this packing being compressed and thus fitting tightly about the shaft extension 22 so as to prevent leakage of oil from the gear casing. The bearings for the shaft 16 are preferably equipped with bushings 16$^a$ corresponding to the bushings 26 and 32, and with glands 16$^b$ corresponding to the glands 35 so that oil is likewise prevented from being discharged from the gear casing about the shaft 16.

The transmission gearing above described is, as stated, bolted or otherwise secured upon the base 4 and in such position that the shaft extension 22 will be in axial alinement with the shaft of the motor 3, which shaft is indicated by the numeral 37. Any suitable coupling may be provided for connecting the juxta-positioned ends of the shafts 22 and 37 as, for example, the sleeve coupling 38 secured by set screws 39, or, if desired, by tapered pins or keys. In this manner, the shaft extension 22 is connected with the motor shaft so that when the motor is operated the worm 20 will be rotated and rotary motion will be imparted to the shaft 16 through the worm gear 17.

In order to protect the rotating shafts 22 and 37 and prevent any objects from coming in contact therewith and with the coupling provided between the ends of the shafts, a guard such as shown in Figure 5 of the drawings, is preferably employed. This guard, which is indicated in general by the numeral 40, comprises an arched body 41 having a top portion 42 and substantially vertically disposed side portions 43, the body being formed preferably from sheet metal of a suitable gage and having its lower marginal portion flanged as at 44 so as to provide means whereby the body may be secured upon the upper surface of the base 4. The body is of a length to extend between the adjacent ends of the motor casing and gear casing 11 and, in fact, snugly abuts at its end edges against the opposing sides or ends of these casings as best shown in Figures 1 and 2 of the drawings. In order to prevent the bearings which are enclosed by the guard 40 from becoming overheated, means is provided for ventilating the space enclosed by the said guard and to this end the guard is formed in its side portions 43 with oppositely located openings 45 which may be rectangular or of any other desired form and which are covered by sheets 46 of foraminous material such for example, as wire mesh. Thus, provision is made for ventilation and yet the rotating parts are protected from the accummulation of lint or from coming in contact with objects brought in proximity thereto.

In order that power may be transmitted from the shaft 16 to the power shaft 2 of the loom, a gear 47, preferably of the silent sprocket type, is fixed upon the outer end of this shaft or, in other words, that end which is remote from the frame 1 of the loom, and a silent chain belt 48 is trained about this gear and about a gear of similar type indicated by the numeral 49, which is mounted upon the shaft 2. The gear 49 is keyed or otherwise fixed upon the hub 50 of one member 51 of a disc clutch, the other member of which clutch is indicated by the numeral 52 and is provided with a hub 53 keyed or otherwise secured as at 54 upon the shaft 2. The clutch members 51 and 52 are provided upon their coacting faces with friction facings 55 which may be of any material suitable for the purpose, so that when the member 51 is shifted upon the shaft 2, it will be brought into frictional clutching engagement with the member 52 and will, therefore, be connected for rotation with the said shaft 2, as will also the gear 49. The hub of the gear 49 is indicated by the numeral 56 and is provided with a circumscribing groove 57 for the engagement of a shifting yoke 58 of the usual type. A collar 59 is secured upon the outer end of the shaft 2 and serves to limit the outward shifting movement of the clutch member 51 upon its shaft.

In connection with the gears 47 and 49 and the chain 48, there is provided a guard which is most clearly shown in Figure 6 of the drawings, and is indicated in general by the numeral 50. This guard comprises a plate 61 provided marginally with a flange 62 extending continually therearound, the plate and flange being of such shape and dimensions as to adapt the guard to be disposed in position enclosing the gears 47 and 49 and the chain 48 in the manner best shown in Figure 2 of the drawings. The plate 61 may be provided with openings 63 and 64 for the shafts 16 and 2 respectively, and the flange 62 at a suitable point is cut away as at 65 for the passage of the shifting lever 58. Apertured lugs 66 are formed upon the flange 62, and the base 4 is provided at its forward or outer sides with outstanding threaded studs 67 adapted to fit through the said lugs 66 and having nuts 68 threaded thereon, the guard 60 being, in this manner, securely and firmly supported in position to house the gears and sprocket chain above referred to.

Having thus described the invention, what is claimed as new is:

1. In mechanism of the class described, a supporting base, a motor thereon, transmission gearing upon the base driven from the motor and including a shaft, a gear upon the shaft, a gear to be driven from the first mentioned gear, operative gear connection between said gears, the base being provided with threaded studs projecting from one edge thereof, a guard for the said gears and gear connection having apertured lugs receiving the said studs, and nuts threaded upon the studs.

2. In mechanism of the class described, a base, a motor supported upon the base, power transmission mechanism also mounted upon the base and driven from the motor and including a gear, a gear to be driven from the first mentioned gear and having operative gear connection therewith, and a guard for the said gears and connection supported solely upon one edge of the said base.

In testimony whereof I affix my signature.

DON CARLOS LEONARD. [L. S.]